Oct. 19, 1948.  M. T. HEDQUIST ET AL  2,451,553
PROTECTIVE SHIELD FOR ORCHARD TRACTORS
Filed June 29, 1946  2 Sheets-Sheet 1
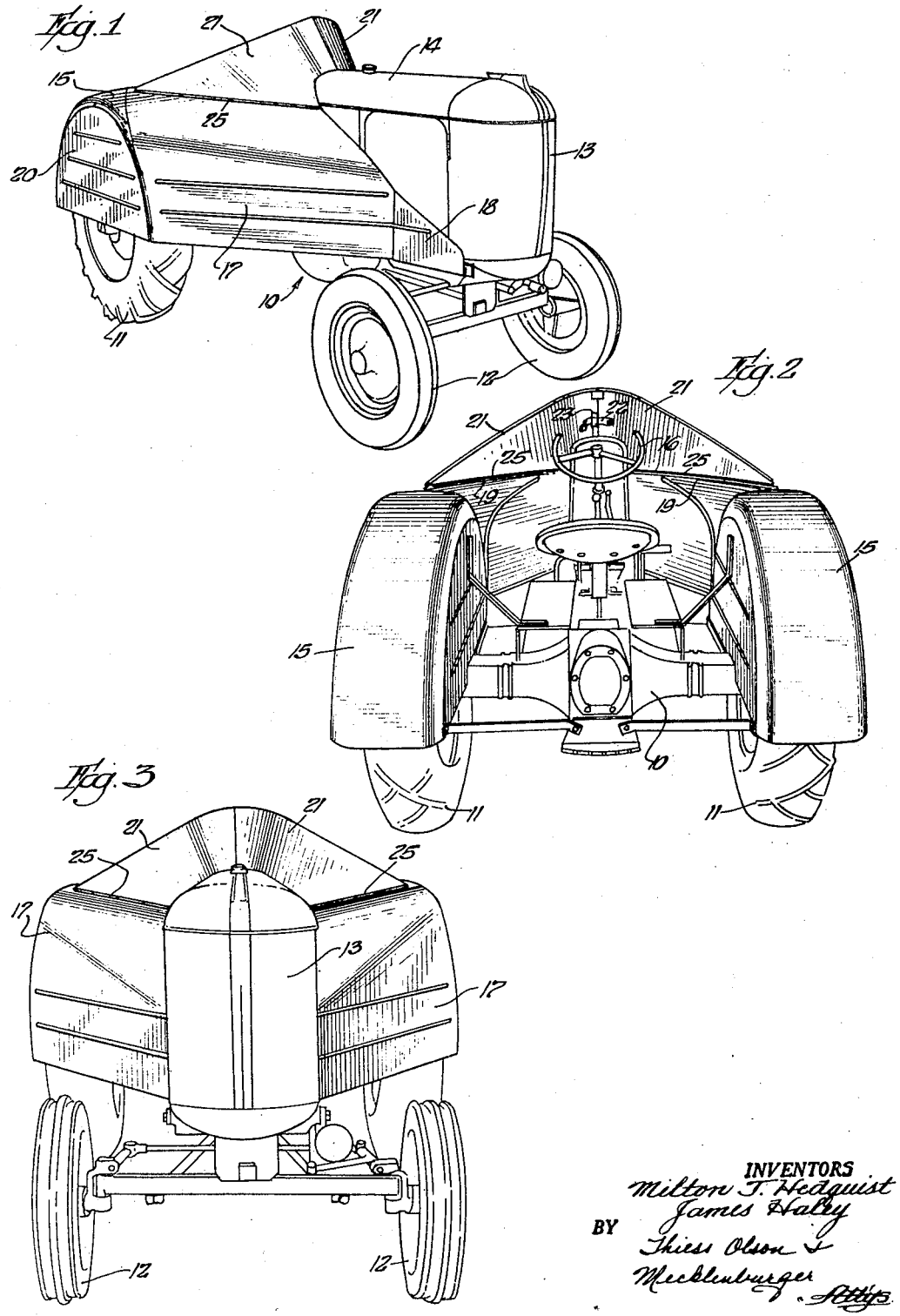
INVENTORS
Milton T. Hedquist
James Haley
BY Thiess Olson &
Mecklenburger Attys.

Oct. 19, 1948.    M. T. HEDQUIST ET AL    2,451,553
PROTECTIVE SHIELD FOR ORCHARD TRACTORS
Filed June 29, 1946    2 Sheets-Sheet 2
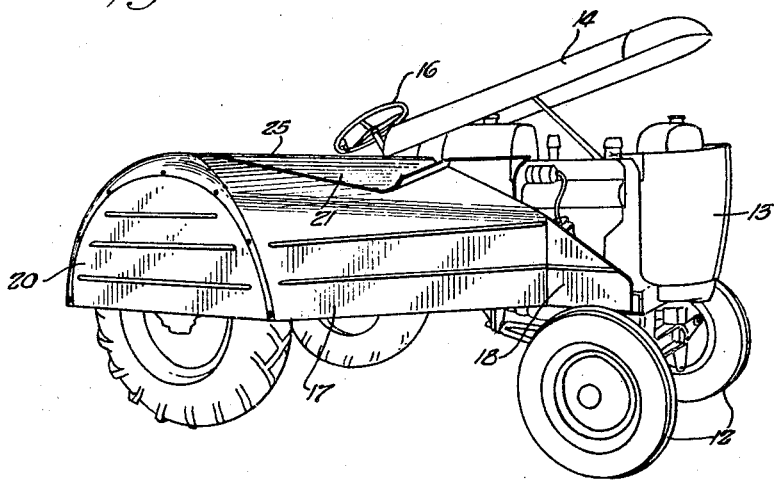
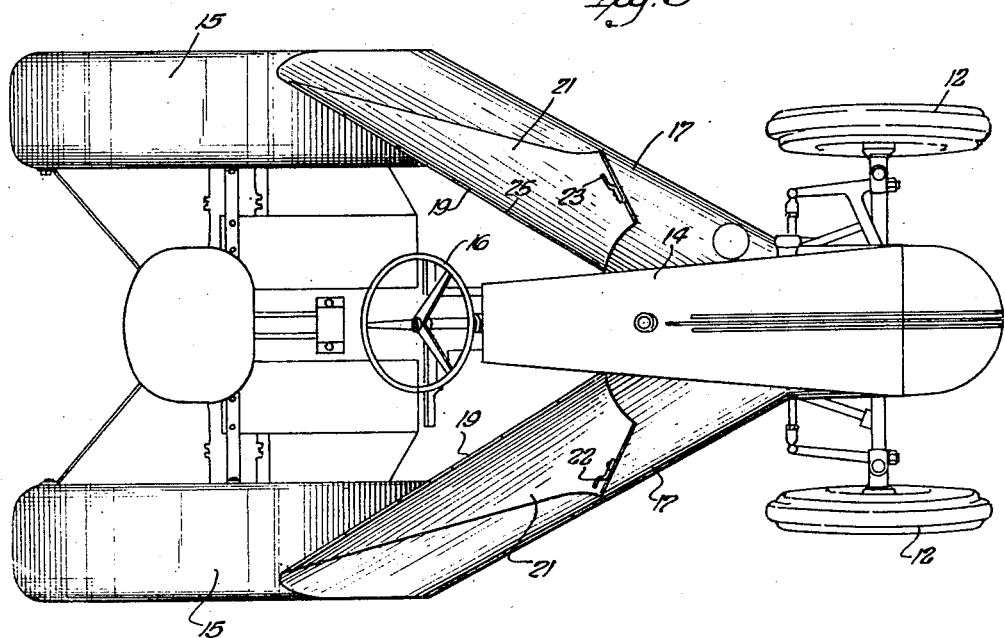
INVENTORS
Milton T. Hedquist
James Haley
BY
Thiess Olson &
Mecklenburger Attys.

Patented Oct. 19, 1948

2,451,553

UNITED STATES PATENT OFFICE 2,451,553

PROTECTIVE SHIELD FOR ORCHARD TRACTORS

Milton T. Hedquist and James Haley, Rock Island, Ill., assignors to J. I. Case Company, Racine, Wis., a corporation of Wisconsin Application June 29, 1946, Serial No. 680,440

6 Claims. (Cl. 180—1)

This invention relates to tractors, more particularly to tractors adapted for work in orchards where the tractor must be operated through low hanging branches, and the invention has for an object the provision of a tractor of this character which is so constructed as to guard against catching or snagging of the fruit-laden branches on extending parts and leading edges of the tractor structure, which is of simple and rugged construction and which requires no modification of the basic tractor structure.

Orchard tractors have heretofore been constructed having streamlined shields covering portions or all of the tractor body to provide smooth and continuous surfaces, permitting the fruit laden branches to slide thereover without bumping or catching so as to cause bruising of the fruit. In such prior structures, however, the conventional fenders or mudguards and the engine hoods have been replaced by specially constructed shielding parts, thereby adding to the manufacturing cost and, in some instances, rendering difficult proper servicing of the tractor. Something is yet to be desired, therefore, in orchard tractors of the character indicated, and it is a further object of this invention to provide an improved orchard tractor having protecting shield means presenting streamlined surfaces throughout the length of the tractor which supplement the conventional body structure without interfering with the normal functioning and servicing of the tractor.

In carrying out the invention in one form a tractor having a conventional hood, including a top portion adapted to be elevated to open the hood for inspection and servicing of the engine, and having a steering wheel disposed rearwardly of and projecting above the top of the hood is provided with a streamlined shield comprising a pair of shield members respectively extending along opposed sides of the steering wheel in forwardly converging relation, each of the shield members including an inwardly curved front portion shaped to conform to the top portion of the hood and to abut the correspondingly shaped front portion of the other shield member to form a sloping shield extending upwardly from the top portion of the hood in front of the steering wheel, together with means for releasably latching the shield members in abutting relation and hinge means mounting the shield members for outward swinging movement to positions outwardly of the top portion of the hood to permit elevation of the top portion to open the hood for servicing and inspection. More particularly, the tractor includes a pair of laterally spaced rear wheels having conventional mudguards, and a main body shield is provided including substantially vertical walls extending forwardly and inwardly from the respective outer edges of the mudguards and terminating substantially in the respective side planes of the hood, the vertical walls having the upper rear portions thereof curved inwardly and terminating in upper edges extending angularly inward from the top of the mudguards to the sides of the hood, the shield members for the steering wheel being respectively hinged to the angular upper edges of the body shield.

For a more complete understanding of the invention reference should now be had to the drawings, in which:

Fig. 1 is a perspective view taken from one side and slightly forward of an orchard tractor embodying the present invention;

Fig. 2 is a perspective view taken directly from the rear and slightly above the tractor;

Fig. 3 is a perspective view taken from directly in front and slightly above the tractor;

Fig. 4 is a perspective view of the tractor showing the hood in elevated position for inspection and servicing of the engine; and Fig. 5 is a top plan view with the steering wheel shield members folded outwardly to permit elevation of the hood as in Fig. 4.

Referring now to the drawings the invention is shown as embodied in an orchard tractor having the usual body structure or chassis 10 supported on laterally spaced rear wheels 11 and front dirigible wheels 12, the engine for the tractor being contained within the conventional hood which comprises a radiator shell 13 and a top portion 14 adapted to be elevated to the position shown in Fig. 4 when it is desired to service or inspect the engine. The tractor thus far described is entirely conventional and is provided, as shown, with the usual fenders or mudguards 15 and a steering wheel 16 which, as shown best in Figs. 4 and 5, is disposed rearwardly of the top portion 14 of the engine hood and extends above the top of the hood when the hood is closed.

In order to provide a streamlined orchard tractor which will not injure the fruit laden boughs of the orchard trees when the tractor is operated through low hanging branches, the tractor is provided with a main body shield which includes identical shield members disposed on opposite sides of the tractor and formed to provide rear portions 17 having vertical walls which converge inwardly from the outer edges of the mudguards 15 and terminate in front portions 18 lying substantially in the respective planes of the sides of the engine hood. As shown, the upper portions of the vertical walls 17 are curved inwardly so as to overlie the mudguards 16 and these upper portions terminate in angularly extending upper edges 19 (Fig. 5) which extend angularly inward from the top of the mudguards to the sides of the hood. The main body shield is completed by skirt portions 20 mounted on the mudguards 16, and it will be understood that the shield members 17, 18 and 20 may be secured to the mudguards and the tractor hood in any demountable fashion as by bolting, or otherwise, to allow removal of the wheels when necessary.

Hingedly secured to each of the angularly extending upper edges 19 of the main body shield by hinges 25 is a steering wheel shield or wing member 21, the two wing members 21 being of identical shape and being formed to present a shield which gradually increases in height from the rear end thereof, the forward portion of each of the wings 21 being curved inwardly as shown and shaped to overlie the top portion 14 of the engine hood and to abuttingly engage the similarly curved front portion of the other wing member. The curved front portions of the wing members 21 are sloped rearwardly, as shown, so that when the wing members are in the position shown in Figs. 1, 2 and 3 a rearwardly sloping streamlined shield is provided extending upwardly from the top of the hood in front of the steering wheel to prevent the low hanging boughs from snagging or bumping into the steering wheel. As shown in Figs. 2 and 5, one of the steering wheel shields or wing members 21 is provided with a pivoted latch 22 and the other wing member is provided with a cooperating catch 23, thereby providing releasable latch means for retaining the wing members 21 in the shielding positions shown in Figs. 1 to 3, inclusive.

When it is desirable or necessary to inspect or service the engine of the tractor, access to the engine by elevation of the hood 14 may be accomplished merely by releasing the latch means 22—23 and folding the wing members 21 outwardly to the positions shown in Figs. 4 and 5, in which positions of the wing members the top of the hood 14 is free for elevation to the position shown in Fig. 4. Thus it will be observed that a streamlined, shielded tractor is provided which requires no modification of conventional tractor construction, which adequately protects the tree boughs from injury during operation of the tractor, and which permits ready servicing of the tractor in the usual manner.

While we have shown a particular embodiment of our invention, it will be understood, of course, that we do not wish to be limited thereto since many modifications may be made, and we, therefore, contemplate by the appended claims to cover any such modifications as fall within the true spirit and scope of our invention.

Having thus described our invention, what we claim and desire to secure by Letters Patent is:

1. In an orchard tractor having a hood and a steering wheel disposed rearwardly thereof and projecting above said hood, a streamlined shield for protecting orchard trees from injury by snagging in said steering wheel comprising a pair of shield members respectively extending along opposed sides of said steering wheel in forwardly converging relation, each of said shield members including an inwardly curved front portion shaped to conform to the top of said hood and to abut the correspondingly shaped front portion of the other shield member to form a sloping shield extending upwardly from said hood in front of said steering wheel, hinge means mounting each of said shield members for swinging movement outwardly from said abutting relation, and releasable means for latching said shield members in said abutting relation.

2. In an orchard tractor having a hood and a steering wheel disposed rearwardly thereof and projecting above said hood, a streamlined shield for protecting orchard trees from injury by snagging in said steering wheel comprising a pair of shield members respectively extending along opposed sides of said steering wheel in forwardly converging relation, each of said shield members being of gradually increasing height from the rear end thereof and including an inwardly curved front portion shaped to conform to the top of said hood and abut the correspondingly shaped front portion of the other shield member, said front portions being rearwardly sloped to form a sloping shield extending upwardly from said hood in front of said steering wheel, hinge means mounting each of said shield members on said tractor for swinging movement outwardly from said abutting shield-forming position, and means for releasably latching said shield member in said shield forming position.

3. In an orchard tractor having an engine hood including a top portion adapted to be elevated to open the hood for inspection and servicing of the engine, and a steering wheel disposed rearwardly of said hood at a higher level than said top portion when the hood is closed, the combination of shield members extending angularly along opposed sides of said steering wheel in forwardly converging relation, each of said shield members including an inwardly curved front portion shaped to conform to said top portion and to abut the correspondingly shaped front portion of the other shield member to form a sloping shield extending upwardly from said top portion of said hood in front of said steering wheel, means for releasably latching said shield members in abutting relation, and hinge means mounting said shield members for outward swinging movement to positions outwardly of said top portion to permit elevation thereof to open said hood.

4. In an orchard tractor having an engine hood including a top portion adapted to be elevated to open the hood for inspection and servicing of the engine, and a steering wheel disposed rearwardly of said hood at a higher level than said top portion when the hood is closed, the combination of shield members extending angularly along opposed sides of said steering wheel in forwardly converging relation, each of said shield members gradually increasing in height from the rear end thereof and including an inwardly curved front portion shaped to conform to said top portion and to abut the correspondingly shaped front portion of the other shield member, said front portions having a rearward slope to form a sloping shield extending upwardly from said top portion of said hood in front of said steering wheel, hinge means mounting said shield members on said tractor for outward swinging movement from abutting positions to positions outwardly from said top portion to permit elevation of said top portion to open said hood, and releasable means for latching said shield members in said abutting relation.

5. In an orchard tractor having a pair of laterally spaced rear wheels, mudguards disposed over said wheels, an engine hood disposed forwardly of said rear wheels having a top portion adapted to be elevated to open the hood for inspection and servicing of the engine, and a steering wheel disposed rearwardly of the hood at a higher level than the top of the hood when the hood is closed, the combination of a streamlined shield for protecting orchard trees from injury by said tractor comprising a main body shield including substantially vertical walls extending forwardly and inwardly from the respective outer edges of said mudguards and terminating substantially in the respective side planes of said hood, said vertical walls having the upper rear portions thereof curved inwardly and terminating in upper edges extending angularly inward from the top of said mudguards to the sides of said hood, and a steering wheel shield comprising a pair of wing members respectively hinged to said upper edges and including front portions curved to overlie said top of said hood and form a sloping shield disposed in front of said steering wheel, and means for locking said wings in shield-forming position, said wings being swingable outwardly on said hinges to positions wherein said top of said hood is free for elevation to open said hood.

6. In an orchard tractor having a hood, a steering wheel disposed rearwardly thereof and projecting above said hood and a main body shield, a stream lined shield for protecting orchard trees from injury by snagging in said steering wheel comprising a pair of shield members respectively extending along opposed sides of said steering wheel in forwardly converging relation, each of said shield members including an inwardly curved front portion shaped to conform to the top of said hood and to abut the correspondingly shaped front portion of the other shield member to form a sloping shield extending upwardly from said hood in front of said steering wheel, hinge means mounting each of said shield members on said main body shield for swinging movement outwardly from said abutting relation, and releasable means for latching said shield members in said abutting relation.

MILTON T. HEDQUIST.
JAMES HALEY.

REFERENCES CITED

The following references are of record in the file of this patent:

UNITED STATES PATENTS

| Number | Name | Date |
|---|---|---|
| 1,424,224 | Westmont | Aug. 1, 1922 |